US005919867A

United States Patent [19]
Yasuda et al.

[11] Patent Number: 5,919,867
[45] Date of Patent: *Jul. 6, 1999

[54] BLOCK COPOLYMER AND A PREPARATION PROCESS THEREOF

[75] Inventors: Hajime Yasuda; Eiji Ihara, both of Higashihiroshima; Akira Yanagase, Hiroshima; Hitoshi Ige, Toyama; Seiji Tone; Toru Tokimitsu, both of Otake, all of Japan

[73] Assignee: Mitsubishi Rayon Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/860,326

[22] PCT Filed: Dec. 22, 1995

[86] PCT No.: PCT/JP95/02630

§ 371 Date: Jun. 23, 1997

§ 102(e) Date: Jun. 23, 1997

[87] PCT Pub. No.: WO96/19513

PCT Pub. Date: Jun. 27, 1996

[30] Foreign Application Priority Data

Dec. 22, 1994 [JP] Japan .................................. 6-335456

[51] Int. Cl.⁶ .................................................. C08F 297/00
[52] U.S. Cl. ........................................... 525/299; 525/269
[58] Field of Search ............................................... 525/299

[56] References Cited

U.S. PATENT DOCUMENTS

| | | | |
|---|---|---|---|
| 4,921,901 | 5/1990 | Ueki | 525/244 |
| 5,132,369 | 7/1992 | Yasuda | 525/299 |
| 5,489,651 | 2/1996 | Novak | 525/269 |
| 5,527,751 | 6/1996 | Inamatsu | 525/299 |
| 5,563,219 | 10/1996 | Yasuda | 525/299 |
| 5,670,580 | 9/1997 | Tazaki | 525/240 |

FOREIGN PATENT DOCUMENTS

| | | |
|---|---|---|
| 0 462 588 | 12/1991 | European Pat. Off. . |
| 0 634 429 | 1/1995 | European Pat. Off. . |

OTHER PUBLICATIONS

H. Yasuda et al, "New Approach to Block Copolymerizations of Ethylene with Alkyl Methacrylates and Lactones by Unique Catalysis with Organolanthanide Complexex" Macromolecules, vol. 25, No. 19, 1992.

T. Kitayama et al, "PMMA–Block–Polyisobutylene–PMMA Prepared with Alpha, Omega–Dilithiated Polyisobutylene and its Characterization", Polymer Bulletin, No. 26, 1991.

*Primary Examiner*—Paul R. Michl
*Attorney, Agent, or Firm*—Oblon, Spivak, McClelland, Maier & Neustadt, P.C.

[57] ABSTRACT

An A-B-A type of block copolymer consisting of polymer block A of (meth)acrylate and polymer block B of olefin, having a Mw/Mn of 1.0 to 2.5, is disclosed. This block copolymer can be produced by polymerizing an olefin using a particular rare earth compound as an initiator, and then polymerizing the formed polymer with a (meth)acrylate.

10 Claims, No Drawings

BLOCK COPOLYMER AND A PREPARATION PROCESS THEREOF

TECHNICAL FIELD

This invention relates to an A-B-A type of block copolymer consisting of polymer block A of a (meth)acrylate and polymer block B of an olefin, and a preparation process thereof.

BACKGROUND ART

Polyolefins have a drawback that they have a lower adhesive property, a lower printing property and a lower compatibility with other polymers due to having no polar groups. To overcome the drawback, copolymerization of an olefin with a polar monomer has been attempted. In addition, it is known that an olefin may be copolymerized with methyl methacrylate for the purpose of improvement in an impact resistance, improvement in a flexibility, reduction of a water absorption and imparting a surface hydrophobicity.

Processes for preparing these copolymers have been disclosed; for example, JP-A 59-43003 or JP-A 64-14217 which has disclosed a process for preparation of a copolymer using a titanium catalyst or a nickel catalyst, respectively. Both processes have a drawback that they require a large amount of a Lewis acid or alumioxane as a co-catalyst.

JP-A 1-201302, JP-A 1-201304 and JP-A 63-43914 have disclosed processes that a polyolefin is modified at its ends and is then block-copolymerized with a (meth)acrylate.

However these processes have a drawback that an introduction ratio of the modified ends is low, so that homopolymers of the (meth)acrylate may be produced as by-products.

Furthermore, JP-A 3-255116 and JP-A 4-53813 have disclosed processes that a block copolymer of ethylene-(meth)acrylate may be produced using a monofunctional, trivalent, rare earth compound. However, the former process does not provide a copolymer containing (meth)acrylate in a high proportion, while the latter process provide products with a wide distribution of molecular weight, i.e., Mw/Mn>2, due to a chain-transfer reaction during the polymerization of ethylene and gives homopolymers of ethylene as byproducts. In addition, since ethylene does not react with a propagating end of (meth)acrylate, these processes can provide only two-component block copolymers of ethylene-(meth)acrylate.

Recently, difunctional rare earth complexes as a polymerization initiator have been proposed for preparation of homopolymers of ethylene or copolymer of ethylene with other monomers. Specifically, William J. Evans et al. have polymerized ethylene using a difunctional rare earth complex as an initiator (J.Am.Chem.Soc., 1990, 112, pp.2314–2324). Bruce M. Novak and Lisa S. Boffa have obtained a three-component block copolymer of poly (methyl methacrylate) block-poly(ethyl acrylate) block-poly (methyl methacrylate) block, using a difunctional rare earth complex as an initiator (ACS Polymer Preprint., 35(2), 1994 and Boffa, MACRO AKRON '94, 117). Yasuda et al. have polymerized ethylene using a bivalent samarium complex as an initiator. (Polymer Preprints). Japan, Vol.43, No.6 (1994)). These reports, however, do not imply an A-B-A type of block copolymer of this invention.

Generally, as described in "P. L. Watoson and T. Herskorvitz ACS symposium series No.212, p.459–479", it is known that a bivalent samarium complex makes ethylene polymerize according to the following formula (III).

Specifically, when both ends of a polymer produced are living ends, an A-B-A type of block copolymer may be produced by adding another monomer.

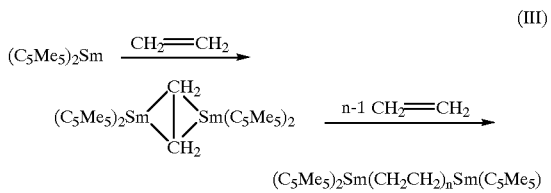

(III)

The present inventors have proposed the preparation of an A-B-A type of block copolymer consisting of ethylene and a (meth)acrylate in JP-A 6-306112 by applying the above concept, but the process has a drawback that a copolymer produced has a Mw/Mn of 4 to 6, indicating a wide distribution of molecular weight, and it produces a large amount of polymers as byproducts such as diblock copolymers and homopolymers of methyl methacrylate.

We have intensively attempted to solve the problems and finally discovered that a particular initiator may provide a three-component block copolymer of (meth)acrylate—olefin—(meth)acrylate having a narrow distribution of molecular weight, to achieve this invention.

DISCLOSURE OF INVENTION

This invention provides an A-B-A type of block copolymer consisting of polymer block A of (meth)acrylate and polymer block B of olefin, characterized in that its Mw (weight average molecular weight)/Mn (number average molecular weight) is 1.0 to 2.5.

This invention also provides a process for preparing an A-B-A type of block copolymer consisting of polymer block A of (meth)acrylate and polymer block B of olefin, characterized in that an olefin is polymerized using a difunctional rare earth compound represented by the following general formula (I) as an initiator, and then the polymer produced is polymerized with (meth)acrylate;

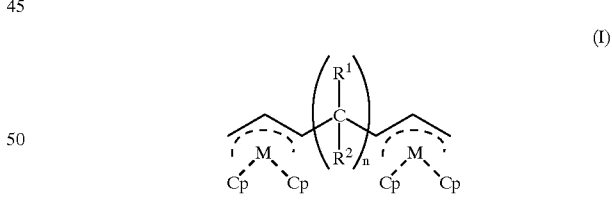

(I)

wherein M represents Sc, Y or a lanthanide atom such as La, Ce, Pr, Nd, Pm, Sm. Eu, Gd, Tb, Dy, Ho, Er, Tm, Yb or Lu; Cp represents cyclopentadienyl or substituted cyclopentadienyl group; and $R^1$ and $R^2$ each represents hydrogen atom or a hydrocarbon group having 1 to 5 carbon atoms; and n represents an integer from 1 to 10.

This invention also provides a process for preparing an A-B-A type of block copolymer consisting of polymer block A of (meth)acrylate and polymer block B of olefin, characterized in that an olefin is polymerized using an organo rare earth compound represented by the following general formula (II) as an initiator, and then the polymer produced is polymerized with a (meth)acrylate;

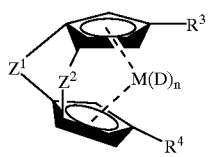

wherein $R^3$ and $R^4$ each represents a hydrocarbon group having 1 to 5 carbon atoms or a hydrocarbon group containing a silicon atom; $Z^1$ and $Z^2$ each represents an alkylene groups, an alkylsily group or an alkylsiloxane group, having 1 to 3 carbon atoms; M represents Sc, Y or a lanthanide atom; D represents a solvent molecule; and n represents an integer from 0 to 3.

BEST MODE FOR CARRYING OUT THE INVENTION

In the block copolymer of this invention, specific examples of (meth)acrylates which produce polymer block A of a (meth)acrylate (referred to as "polymer block A") include acrylates such as methyl acrylate, ethyl acrylate, n-propyl acrylate, iso-propyl acrylate, n-butyl acrylate, iso-butyl acrylate, t-butyl acrylate, iso-amyl acrylate, lauryl acrylate, benzyl acrylate, phenyl acrylate, glycidyl acrylate and 2-ethylhexyl acrylate; and methacrylates such as methyl methacrylate, ethyl methacrylate, n-propyl methacrylate, iso-propyl methacrylate, n-butyl methacrylate, iso-butyl methacrylate, t-butyl methacrylate, iso-amyl methacrylate, lauryl methacrylate, benzyl methacrylate, phenyl methacrylate, glycidyl methacrylate, 2-ethylhexyl methacrylate, 2-methoxyethyl methacrylate and diethyleneglycol monomethyl ether methacrylate; preferably methyl methacrylate, ethyl methacrylate, t-butyl methacrylate, lauryl methacrylate, n-butyl acrylate and methyl acrylate. These monomers may be used either solely or in combination of two or more.

Specific examples of an olefin which produce polymer block B of olefin (referred to as "polymer block B") include ethylene, propylene, 1-butene, 4-methyl-1-pentene, 1-hexene, 1-octene and 1-decene, preferably ethylene, propylene and 1-hexene.

The A-B-A type of block copolymer of this invention consists of the above polymer block A and the above polymer block B. The polymer block A may consist of two or more block polymers of (meth)acrylates. Thus the copolymer may be, for example, A'-A-B-A-A' or A"-A'-A-B-A-A'-A" type of block copolymer. The polymer block A may be a random copolymer of two or more (meth)acrylate The block copolymer of this invention has a Mw/Mn of 1.0 to 2.5, preferably 1.0 to 2.0. Preferably, the molecular weights of the block copolymers may be, but not limited to, 1,000 to 1,000,000 for polymer block A, and 1,000~1,000,000, more preferably 10,000~1,000,000 for polymer block B, as a number average molecular weight (Mn). The Mn of the overall block copolymer is preferably 3,000~3,000,000, more preferably 12,000~2,000,000.

The block copolymer of this invention can be prepared according to a process as described below, using the organo rare earth compound represented by the above general formula (I) or (II) as an initiator. As the first step, an olefin is polymerized by introducing the olefin monomer into a solvent in an atmosphere of inert gas. Next, the second step polymerization is initiated by adding a (meth)acrylate to give the copolymer of this invention. When two or more (meth)acrylates are used to provide the polymer block A as a combined block consisting of two or more (meth)acrylate blocks, first, one (meth)acrylate is polymerized, and then other (meth)acrylates are added to initiate polymerization. When the polymer block A is to be a random copolymer of (meth)acrylates, a mixture of monomers may be added to be polymerized.

The olefins and the (meth)acrylates may be preferably dried with a drying agent such as calcium hydride and molecular sieves. When the monomers are liquid or solid, they are preferably distilled just before their polymerization.

The organo rare earth compounds used in this invention are represented by the above general formula (I) or (II). Specific compounds of formula (I) may include the followings;

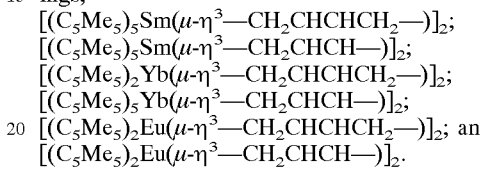

Specific compounds of formula (II) may include the followings;

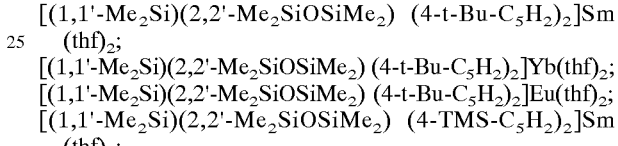

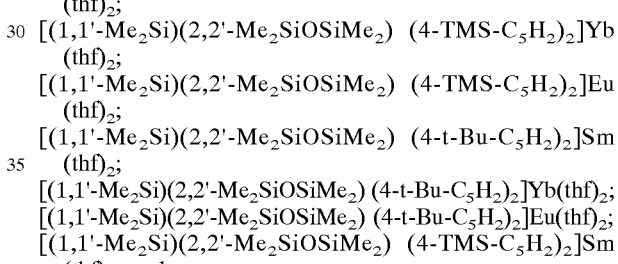

When an organic rare earth compound is [(1,1'-Me$_2$Si)(2,2'-Me$_2$SiOSiMe$_2$) (4-t-Bu-C$_5$H$_2$)$_2$]Sm(thf)$_2$, $R^1$, $R^2$, $Z^1$, $Z^2$, D and n in formula (II) are $R^1$=$R^2$=t-Bu (tertiary-butyl group); $Z^1$=Me$_2$Si (dimethylsilyl group); $Z^2$=Me$_2$SiOSiMe$_2$ (1, 1, 3, 3-tetramethylsiloxane group); D=thf (tetrahydrofuran); and n=2, wherein Me represents methyl group and TMS represents trimethylsilyl group.

The amount of the organo rare earth compound may be 0.001 to 100 mmol, preferably 0.01 to 10 mmol per 1 mol of a (meth)acrylate monomer.

Inert gases which may be used in the polymerization include argon, helium and nitrogen, preferably argon.

Solvents which may be used in the polymerization include hydrocarbons such as toluene, xylene, benzene, hexane and tetralin; halogenated hydrocarbons such as chloroform, dichloromethane, carbon tetrachloride, dichlorobenzenes and trichlorobenzenes; tetrahydrofuran; and diethylether, preferably toluene and xylene. Preferably, these solvents may be fully dried, and their amount may be 1 to 50,000 mL per 1 mol of a (meth)acrylate.

The polymerization temperature is not particularly restricted as long as between the melting point and the boiling point of the solvent used, but is preferably −78° C. to 80° C., more preferably −40° C. to 40° C.

In the process of this invention, the degree of polymerization of the polymer block B moiety may be freely controlled by adjusting the concentration of the initiator, the concentrations of the monomers and polymerization time, while the degree of polymerization of the polymer block A moiety may be freely controlled by adjusting the concentration of the (meth)acrylate monomer and polymerization time.

This invention will be specifically described by the following examples. Preparation of starting materials and, recovery of a block polymer and evaluation of the physical properties of a block copolymer were performed as follows.
(1) Preparation of Starting Materials
   (a) Purification of a (meth)acrylate
   Commercially available monomer was dried over calcium hydride and distilled, and then a trace amount of water was removed with molecular sieves. It was distilled under a reduced pressure just before its use.
   (b) Purification of Ethylene
   Ethylene was passed through molecular sieves to be dried just before its use.
   (c) Purification of Toluene
   Commercially available toluene was dried over Na/K alloy and distilled just before its use.
(2) Evaluation of the physical properties of a block copolymer
   (a) Mn and Mw/Mn
   These were determined by high-temperature GPC (gel permeation chromatography; solvent: trichlorobenzene; temperature: 135° C.; standard: polystyrene).
   (b) The composition ratio of a block copolymer
   This was calculated based on an $^1$H NMR spectrum (solvent: p-xylene-$d_{10}$; measurement temperature: 120° C.).

EXAMPLE 1

(1) Preparation of an initiator, [(1,1'-Me$_2$Si)(2,2'-Me$_2$SiOSiMe$_2$) (4-t-Bu-C$_5$H$_2$)$_2$]Sm(thf)$_2$, R$^1$, R$^2$, Z$^1$, To a solution of SmI$_2$ (11.5 mmol) in 120 mL of tetrahydrofuran (THF) prepared under argon stream was added dropwise a solution of potassium salt of a ligand, [(1,1'-Me$_2$Si)(2,2'-Me$_2$SiOSiMe$_2$) (4-t-Bu-CH$_2$)$_2$]K$_2$(11.8 mmol) in 60 mL of THF, and the mixture was refluxed for 12 hours. Insoluble solid was removed, and the mixture was evaporated to dryness under a reduced pressure. To the residue was added 70 mL of toluene, the mixture was stirred for 12 hours, and insoluble solid was removed to obtain a supernatant. Then, toluene was removed under a reduced pressure, and the dried residue was dissolved in 50 mL of THF. The solution was concentrated to a half amount and then cooled to −20° C., resulting in dark claret complex, [(1,1'-Me$_2$Si)(2,2'-Me$_2$SiOSiMe$_2$) (4-t-Bu-C$_5$H$_2$)$_2$]Sm (thf)$_2$, (Yield: approximately 45%).

$^1$H NMR (C$_6$D$_6$, 25° C., PPM): δ −4.99 (s, 18H), −2.54 (s, 3H), −1.09 (s, 6H), 3.19 (bs, 12H), 6.30 (s, 2H), 10.51 (bs, 12H), 10.75 (s, 3H), 11.26 (s, 6H), 41.26 (s, 2H).

(2) Preparation of a copolymer

In 15 mL of toluene in a 100 mL flask in an atmosphere of argon was dissolved 0.02 mmol of the complex, [(1,1'-Me$_2$Si)(2,2'-Me$_2$SiOSiMe$_2$) (4-t-Bu-C$_5$H$_2$)$_2$]Sm(thf)$_2$, and then argon was replaced with ethylene via cooling degasification. Ethylene was subject to polymerization at room temperature for 5 min., the unreacted ethylene was degassed with cooling and argon was introduced. Five mL of the solution containing polyethylene produced was sampled with a syringe, and the residual solution (10 mL) was reacted with 0.5 mL of methyl methacrylate at room temperature for 2 hours.

Then, the reaction solution was poured into a large amount of methanol to deposit a polymer, which was filtered and washed with methanol. The product was dried in vacuo to give a powdery polymer. The polymer was subject to Soxhlet extraction with acetone, and was dried to give 107 mg of block copolymer powder consisting of methyl methacrylate polymer-ethylene polymer-methyl methacrylate polymer. No change in weight was observed between before and after the Soxhlet extraction.

Mn and Mw/Mn of the block B moiety, Mn and Mw/Mn of the block copolymer, and the content of poly(methyl methacrylate) (PMMA) are shown in Table 1. $^1$H NMR (p-xylene-$d_{10}$, 120° C., PPM): δ 1.1 to 1.3 (—Me, PMMA), 1.4 (—CH$_2$—, PE), 2.1 (—CH$_2$—, PMMA), 3.5 (—OMe, PMMA).

EXAMPLE 2

A block copolymer was prepared as described in Example 1, except that ethylene was polymerized for 2 min. The evaluation results for the block copolymer are shown in Table 1.

EXAMPLE 3

A block copolymer was prepared as described in Example 1, except that ethylene was polymerized for 10 min. The evaluation results for the block copolymer are shown in Table 1.

EXAMPLE 4

(1) Preparation of an initiator, [(C$_5$Me$_5$)$_2$Sm($\mu$-$\eta^3$—CH$_2$CHCHCH$_2$—)]$_2$ Into a 100 mL flask was added 7.14 mmol of a complex, (C$_5$Me$_5$)$_2$Sm(thf)$_2$, in an atmosphere of argon, and the mixture was stirred for 6 hours at 60° C. under 10$^{-5}$ Torr. After changing the color of the complex from claret to dark green, 50 mL of hexane was added. Then, the solution was degassed in vacuo, and 1, 3-butadiene gas was introduced. After stirring for 5 hours at room temperature, the orange precipitate formed was separated by centrifugation. The precipitate was completely dissolved in toluene, concentrated to a half amount, and cooled to −20° C., to give a reddish orange complex, [(C$_5$Me$_5$)$_2$Sm($\mu$-$\eta^3$—CH$_2$CHCHCH$_2$—)]$_2$ (Yield: 55.3%).

(2) Preparation of the copolymer

In a 100 mL flask, 0.09 mmol of the complex, [(C$_5$Me$_5$)$_2$Sm($\mu$-$\eta^3$—CH$_2$CHCHCH$_2$—)]$_2$ was dissolved in 20 mL of toluene in an atmosphere of argon, and argon was replaced with ethylene via cooling degasification. After polymerization of ethylene at room temperature for 20 minutes, the unreacted ethylene was degassed with cooling, and then argon was introduced. Ten mL of the solution containing polyethylene formed was sampled by means of a syringe. Then, 0.5 mL of methyl methacrylate was added to the residual solution (10 mL) by means of a syringe, and the mixture was reacted with stirring at room temperature for 30 minutes.

Then, the reaction solution was poured into a large amount of methanol to deposit a polymer, and the polymer was filtered and washed with methanol. The product was dried in vacuo to give a powdery polymer. The evaluation results for the polymer are shown in Table 1.

EXAMPLE 5

A block copolymer was prepared as described in Example 4, except that ethylene was polymerized for 30 minutes. the evaluation results for the block copolymer are shown in Table 1.

TABLE 1

| | Block B moiety | | A-B-A type of block copolymer | | PMMA content (wt. %) |
|---|---|---|---|---|---|
| | Mn | Mw/Mn | Mn | Mw/Mn | |
| Ex. 1 | 50,000 | 1.65 | 75,100 | 1.79 | 33.4 |
| Ex. 2 | 19,100 | 1.64 | 66,800 | 1.57 | 71.4 |
| Ex. 3 | 98,500 | 1.70 | 101,000 | 1.75 | 2.60 |
| Ex. 4 | 2,000 | 1.18 | 22,000 | 1.10 | 90.9 |
| Ex. 5 | 3,800 | 1.48 | 26,000 | 1.53 | 85.4 |

The A-B-A type of block copolymer has an excellent adhesive property; has an excellent printing property; has a superior compatibility with other polymers to a diblock copolymer; and is, therefore, very useful in many applications such as paints and adhesives. Furthermore, the copolymer has improved properties such as an improved impact resistance, an improved flexibility, a reduced water absorption and a surface hydrophobicity, compared with a polymethacrylate.

The process of this invention can readily provide an A-B-A type of block copolymer with a narrow distribution of molecular weight.

We claim:

1. An A-B-A block copolymer consisting of poly(meth) acrylate blocks A and polyolefin block B and having a Mw (weight average molecular weight)/Mn (number average molecular weight) ratio of 1.0 to 2.5, wherein the number average molecular weight of polymer block B ranges from 10,000 to 1,000,000.

2. The block copolymer of claim 1, wherein the Mw/Mn ratio ranges from 1.0 to 2.0.

3. The block copolymer of claim 1, wherein the overall molecular weight of the block copolymer is a number average molecular weight ranging from 12,000 to 2,000,000.

4. The block copolymer of claim 1, wherein the number average molecular weights of block A range from 1,000 to 1,000,000.

5. The block copolymer of claim 1, wherein the (meth) acrylate monomer of polymer block A is a member selected from the group consisting of methyl acrylate, ethyl acrylate, n-propyl acrylate, iso-propyl acrylate, n-butyl acrylate, iso-butyl acrylate, t-butyl acrylate, iso-amyl acrylate, lauryl acrylate, benzyl acrylate, phenyl acrylate, glycidyl acrylate, 2-ethylhexyl acrylate, methyl methacrylate, ethyl methacrylate, n-propyl methacrylate, iso-propyl methacrylate, n-butyl methacrylate, iso-butyl methacrylate, t-butyl methacrylate, iso-amyl methacrylate, lauryl methacrylate, benzyl methacrylate, phenyl methacrylate, glycidyl methacrylate, 2-ethylhexyl methacrylate, 2-methoxyethyl methacrylate and diethyleneglycol monomethyl ether methacrylate.

6. The block copolymer of claim 1, wherein the olefin monomer for polymer block B is ethylene, propylene, 1-butene, 4-methyl-1-pentene, 1-hexene, 1-octene or 1-decene.

7. The block copolymer of claim 1, wherein the monomer of polymer block A is methyl methacrylate, ethyl methacrylate or lauryl methacrylate and the olefin of polymer block B is ethylene.

8. A process of preparing an A-B-A block copolymer, comprising:

polymerizing an olefin in the presence of an organorare earth compound of formula (II) as an initiator:

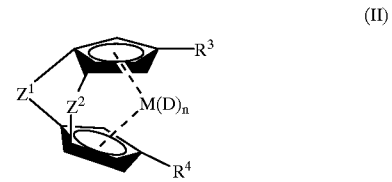

(II)

wherein $R^3$ and $R^4$ each is a $C_{1-5}$-hydrocarbon group or a $C_{1-5}$-hydrocarbon group containing a silicon atom, $Z^1$ and $Z^2$ each is an alkylene group, an alkylsilyl group or an alkylsiloxane group each have 1 to 3 carbon atoms, M is Sc, Y or a lanthanide element, D is a solvent molecule and n is 0 or an integer of 1 to 3; and polymerizing a (meth)acrylate in the presence of the polyolefin, thereby producing said triblock copolymer wherein blocks A are poly(meth)acrylate blocks and block B is a polyolefin block.

9. The process of claim 8, wherein the initiator is an organorare earth compound represented by formula (II) in which M is samarium; $R^1$ and $R^2$ each is tert-butyl or trimethylsilyl group; $Z^1$ is dimethylsilyl; $Z^2$ is 1, 1, 3, 3-tetramethylsiloxane; D is tetrahydrofuran; and n is 2 or 3.

10. The process of claim 8, wherein the polymerization is conducted at a temperature of −40° C. to 40° C.

* * * * *